US010791182B2

(12) United States Patent
Krimon et al.

(10) Patent No.: US 10,791,182 B2
(45) Date of Patent: Sep. 29, 2020

(54) DETECTION AND DETERRANCE OF UNAUTHORIZED USE OF MOBILE DEVICES

(71) Applicant: Intel Corporation, Santa Clara, CA (US)

(72) Inventors: Yuri I. Krimon, Folsom, CA (US); David I. Poisner, Carmichael, CA (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 14/334,105

(22) Filed: Jul. 17, 2014

(65) Prior Publication Data

US 2016/0021199 A1 Jan. 21, 2016

(51) Int. Cl.

| | |
|---|---|
| ***G06F 15/173*** | (2006.01) |
| ***G06F 15/16*** | (2006.01) |
| ***H04L 29/08*** | (2006.01) |
| ***H04M 1/725*** | (2006.01) |
| ***G06F 21/10*** | (2013.01) |
| ***G06F 21/12*** | (2013.01) |

(52) U.S. Cl.

CPC .............. *H04L 67/18* (2013.01); *G06F 21/10* (2013.01); *G06F 21/121* (2013.01); *H04M 1/72572* (2013.01); *H04M 1/72577* (2013.01); *G06F 2221/2111* (2013.01); *H04M 2250/52* (2013.01)

(58) Field of Classification Search

CPC ......... H04L 63/10; H04L 63/20; H04L 51/12; H04L 51/20; H04L 12/585; H04L 67/10; H04L 67/18; H04L 67/20; H04L 67/306

USPC ................. 709/203–205, 220, 225; 455/411, 455/418–419, 466

See application file for complete search history.

(56) References Cited

U.S. PATENT DOCUMENTS

| | | | | |
|---|---|---|---|---|
| 8,781,500 B1* | 7/2014 | Dekel | H04M 1/72572 | 455/412.2 |
| 2010/0227589 A1* | 9/2010 | Cook | H04M 1/72572 | 455/411 |
| 2011/0230211 A1* | 9/2011 | Kim | G06F 21/71 | 455/456.4 |
| 2012/0237908 A1* | 9/2012 | Fitzgerald | G06F 21/88 | 434/236 |
| 2012/0303558 A1* | 11/2012 | Jaiswal | G06N 99/005 | 706/12 |
| 2013/0013932 A1* | 1/2013 | Kong | G06F 21/629 | 713/189 |

(Continued)

*Primary Examiner* — Farzana B Huq

(74) *Attorney, Agent, or Firm* — Schwabe, Williamson & Wyatt, P.C.

(57) ABSTRACT

This disclosure pertains to device-monitoring systems, and in particular (but not exclusively) to detecting and deterring unauthorized use of electronic systems at distinct locations and during specific time periods. An apparatus consistent with the present disclosure includes logic, at least partially implemented in hardware, to receive an entrance message. The entrance message may include at least one policy for the manner to which a device is to be operated when present within a device restricted area. The apparatus may also include logic to send an acknowledgement notification to indicate receipt of the entrance message and an agreement to abide by the at least one policy. Furthermore, the apparatus may also include logic to detect an attempt to execute an action contrary to the at least one policy.

29 Claims, 9 Drawing Sheets

(56) References Cited

U.S. PATENT DOCUMENTS

| | | | | |
|---|---|---|---|---|
| 2013/0054702 | A1* | 2/2013 | Belchee | G06F 21/10 709/206 |
| 2013/0303149 | A1* | 11/2013 | Bocking | G03B 17/00 455/418 |
| 2014/0113593 | A1* | 4/2014 | Zhou | H04L 63/20 455/411 |
| 2015/0042449 | A1* | 2/2015 | Suh | G07C 9/00111 340/5.7 |
| 2015/0050922 | A1* | 2/2015 | Ramalingam | H04W 12/08 455/418 |
| 2015/0382197 | A1* | 12/2015 | Ren | H04W 12/08 726/3 |

* cited by examiner

DETECTION AND DETERRANCE OF UNAUTHORIZED USE OF MOBILE DEVICES

FIELD

This disclosure pertains to device-monitoring systems, and in particular (but not exclusively) to detecting and deterring unauthorized use of electronic systems at distinct locations or during specific time periods.

BRIEF DESCRIPTION OF THE DRAWINGS

To facilitate understanding, identical reference numerals have been used, where possible, to designate identical elements that are common to the drawings. The drawings are not to scale and the relative dimensions of various elements in the drawings are depicted schematically and not necessarily to scale. The techniques of the present disclosure may readily be understood by considering the following detailed description in conjunction with the accompanying drawings, in which.

DETAILED DESCRIPTION

A detailed description of some embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to some embodiments has not been described in detail to avoid unnecessarily obscuring the description.

This disclosure pertains to device-monitoring systems, and in particular to detecting and deterring unauthorized use of electronic systems at distinct locations and/or during specific time periods. Systems consistent with the present disclosure include a policy transmitter device that sends entrance messages to devices present within a device-restricted area.

The entrance message may include policies for the manner to which a device is to be operated within a particular location or for a specific time period. Moreover, the policies (e.g., of device functionality restrictions) listed in the entrance message may also include actions on the device that the user should not take while the device is within the restricted area or during the specified time period. The system further includes a receiver component or device to retrieve acknowledgment notifications from devices present within the device-restricted area. The acknowledgement notifications indicate reception of the entrance message and an agreement to abide by the policy restrictions. The system may further include a server to receive a confession notification that indicates that a device present within the device-restricted area has overridden the policies.

Figure 1:
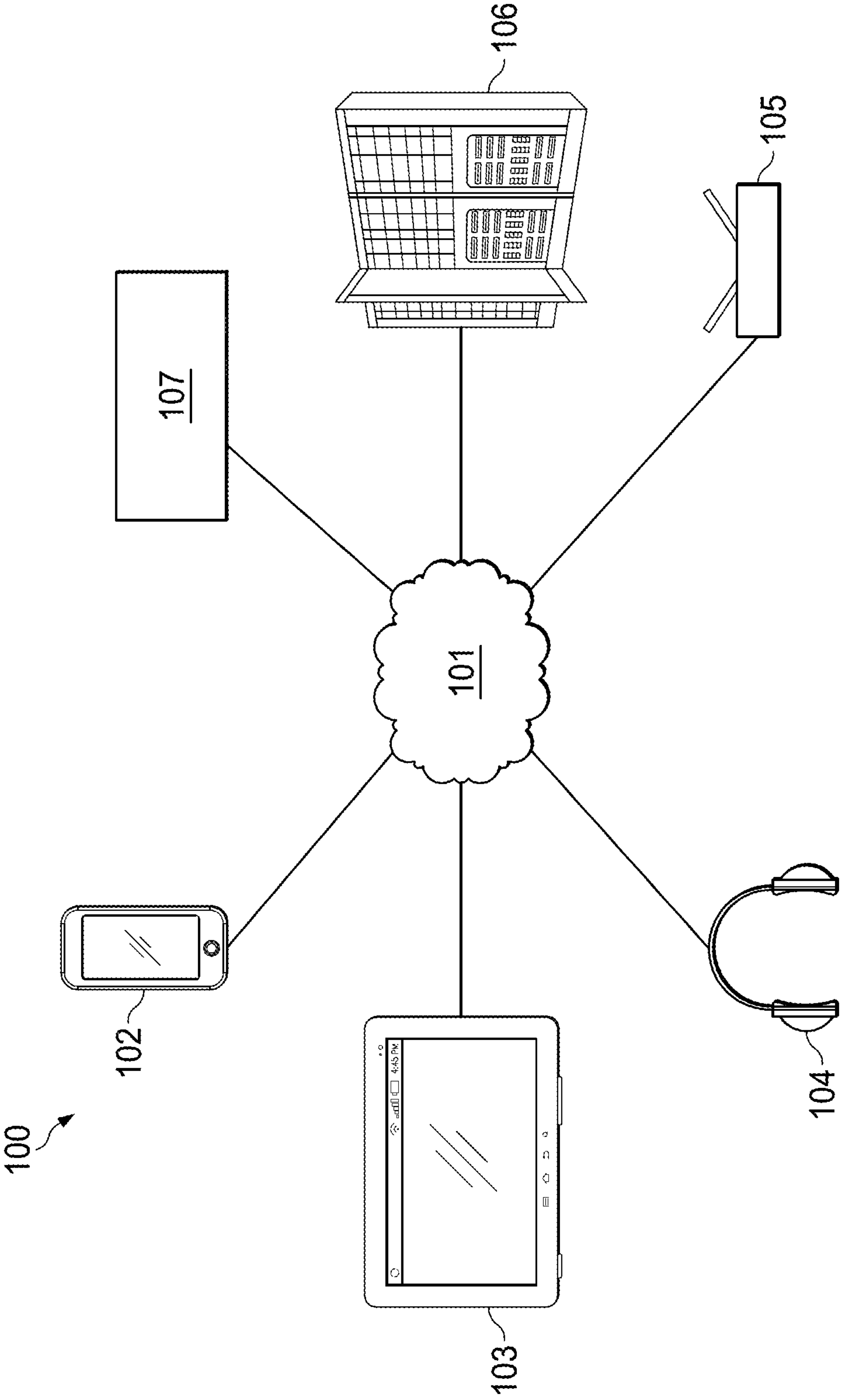
FIG. 1 is an exemplary illustration of devices on a device-restricted network in accordance with systems and methods of the present disclosure.

FIG. 1 is an exemplary illustration of devices on a device-restricted network 101. As shown, network 101 includes a mobile phone device 102, computing tablet 103, and wireless headphones 104. It should be understood that the present disclosure is not limited to the devices shown in FIG. 1. Any device which is capable to send and receive wireless communications is within the spirit and scope of the present disclosure.

Device-restricted network 101 may be any suitable wireless communications network. For example, device-restricted network 101 may include WiFi, 3G/4G, etcetera. Device-restricted network 101 should be able to detect devices within an area where device functionality is to be restricted, at least to some degree, as mandated by venue personnel, system administrators, building owners, etcetera.

In addition, network 101 includes a policy transmitter device 105 which may transmit policy code(s) of policy restrictions for devices on the network 101 as will be described in more detail below. Additionally, a set of computer servers 106 may also be on the device-restricted network 101 to receive device information such as device identification, acknowledgment notifications, and confession reports. Lastly, a display monitor 107 may display acknowledgment notifications, confession reports, and other information regarding device activity on the device-restricted network 101 in real time. As such, the system 100 shown in FIG. 1 is capable of having device functionality restrictions sent to device(s) on the device-restricted network 101 and obtaining information regarding device activity while the devices are within a specific area or during a predetermined time period.

Figure 2:
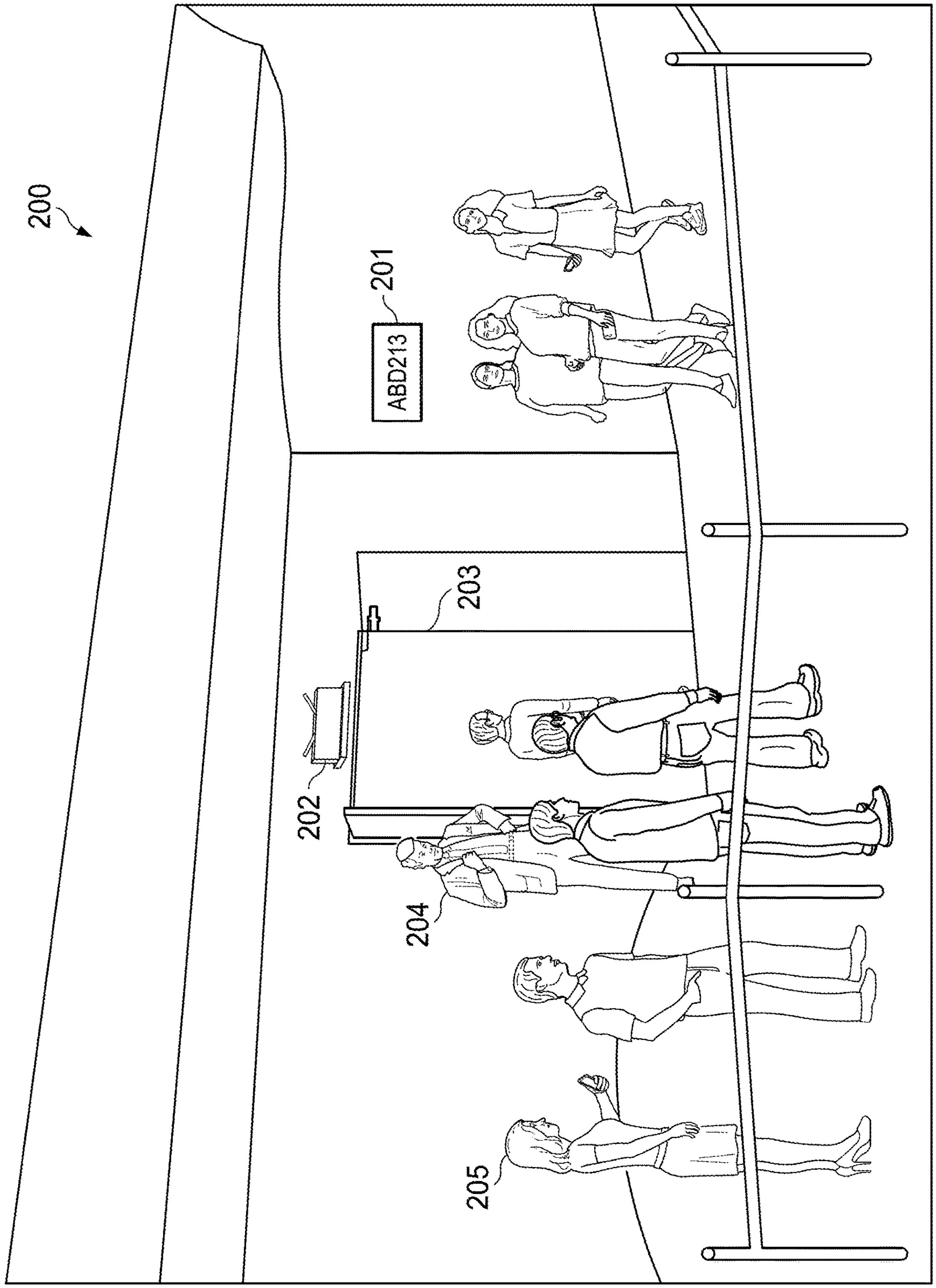
FIG. 2 is an exemplary illustration of a theatre entrance with patrons waiting to gain entrance after accepting a set of policy restrictions for their mobile devices.

FIG. 2 is an exemplary illustration of a theatre entrance 200 with patrons 205 waiting to gain entrance after accepting a set of policy restrictions for their mobile devices. Theatre attendant 204 may also attend to patrons 205 whose devices are not capable of accepting the policy restrictions. Theatre attendant 204 may also remind patrons 205 to download and apply the policy code 201 (e.g., ABD213) enforced for this specific theatre.

It should be understood, however, systems consistent with the present disclosure function without the need for human intervention because a policy exchange may occur automatically via wireless communication transmissions between user devices and the policy transmitter device.

In some implementations, policy transmitter device 202 transmits, via a wireless communications means, an entrance message to each device that is on the device-restricted network. For example, the theatre may provide WiFi, or other suitable wireless network, such that devices (e.g., mobile phones) thereon may communicate with or receive communications from the policy transmitter device 202.

In some embodiments, in order for a device on the device-restricted network to receive an entrance message from the policy transmitter device 202, the device must first have policy-restriction logic (not shown) therein. Policy-restriction logic may detect when a user attempts to execute actions on the device that is contrary to a policy restriction attributed to a specific policy code. In some implementations, policy-restriction logic includes a policy-restriction software application received from a vendor. In other implementations, policy-restriction logic is embedded within the user device hardware or firmware.

Each policy code 201 may have a unique set of policy restrictions that prohibit a user from performing certain functions on the device. For instance, a policy code 201 may prohibit a user device (such as a smartphone) from taking pictures with a camera function thereon or placing a phone call therefrom. It should be understood that the present disclosure is not limited to the aforementioned applications. Accordingly, the policy code(s) 201 may have any set of restrictions which limits device functionality.

In some implementations, if a user attempts to execute a function contrary to a policy restriction, the device via the policy-restriction logic issues a warning message. A user may, however, disregard the policy restrictions and override the warning message. In this event, a confession message may be sent from the device notifying a system administrator of the breach as will be described in more detail below.

Figure 3:
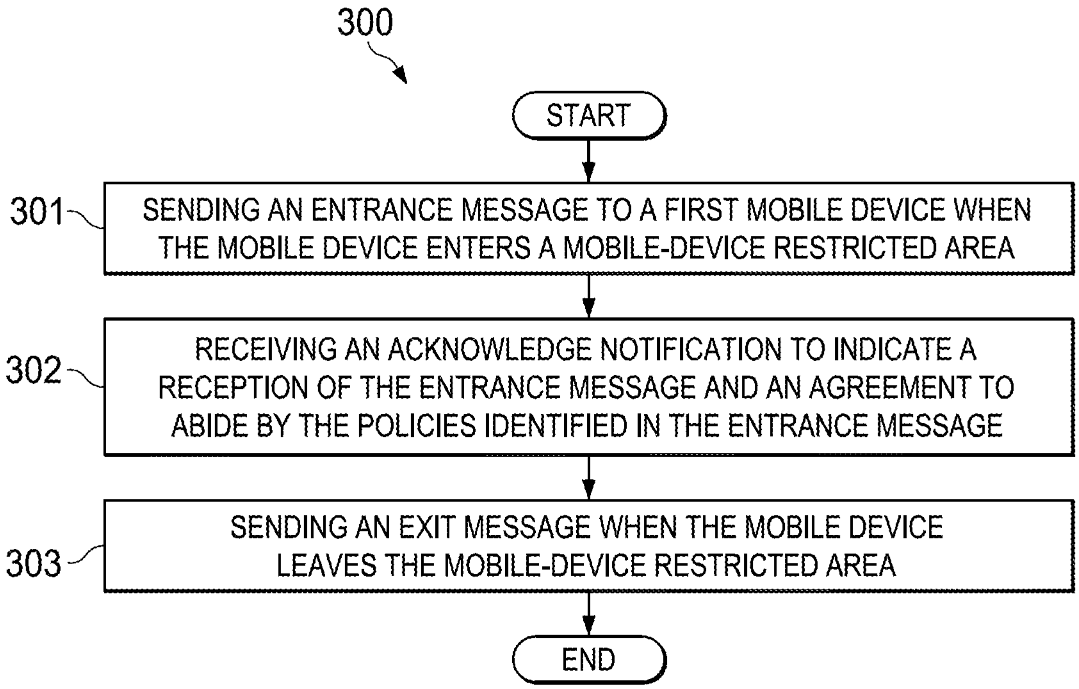
FIG. 3 is a flowchart of a method consistent with the present disclosure.

FIG. 3 is a flowchart 300 of a method consistent with the present disclosure. As shown, the method begins at block 301—sending an entrance message to a device upon entering a device-restricted area (e.g., mobile-device restricted area).

Figure 4:
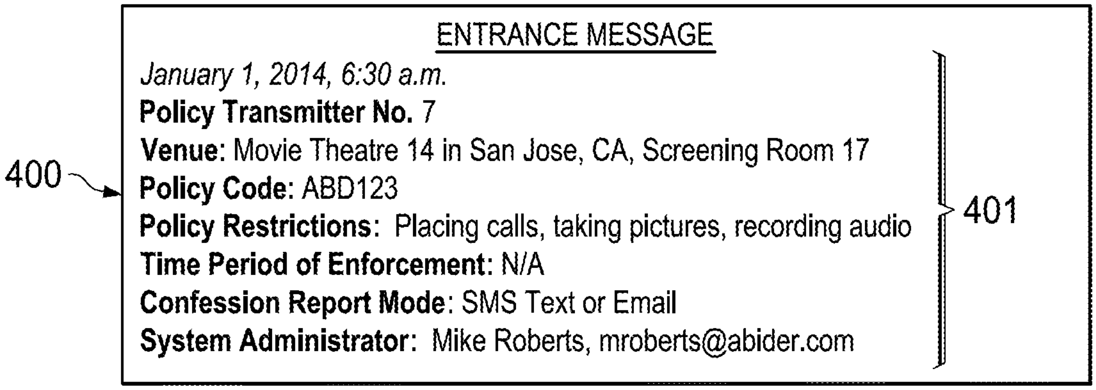
FIG. 4 is an exemplary illustration of an entrance message in accordance with embodiments of the present disclosure.

FIG. 4 is an exemplary illustration of an entrance message 400. Entrance message 400 may be sent by a policy transmitter device to one or more devices on a device-restricted network. In some implementations, the entrance message 400 includes a policy code having a set of policy restrictions associated therewith regarding the manner to which a user may operate the device.

It should be understood, however, that the entrance message 400 does not require a policy code. Therefore, in some implementations, entrance message 400 may not include a policy code but instead may include a set of policy restrictions regarding the manner to which a user may operate the device.

Entrance message 400 may include various information 401 such as the time and date that the entrance message 400 was sent (e.g., Jan. 1, 2014, 6:30 a.m.), the policy transmitter ID (e.g., No. 7), and the venue (e.g., Movie Theatre 14 in San Jose, Calif., Screening Room 17). Entrance message 400 may also include other information such as the policy code, the set of policy restrictions, the time period that the policy restrictions are to be enforced, the mode that confession reports are to be sent, and the name and contact information of the system administrator. It should be appreciated, however, that more or less information may be included in the entrance message 400 so long as a set of policy restrictions is included therewith.

Figure 5:
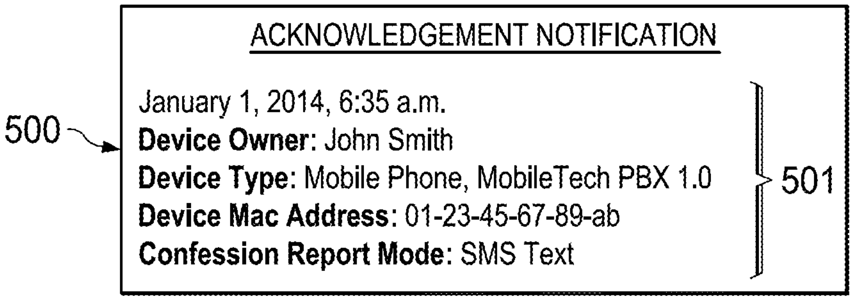
FIG. 5 is an exemplary illustration of an acknowledgment notification in accordance with embodiments of the present disclosure.

Referring back to FIG. 3, block 302 provides receiving an acknowledgement notification to indicate a reception of the entrance message and an agreement to abide by the policies identified in the entrance message. In some implementations, the acknowledgement notification is sent from a user device on the device-restricted network and received by the policy transmitter device. In other implementations, the acknowledgement notification is sent from the user device on the device-restricted network to a server or network of servers on the device-restricted network. An exemplary illustration of an acknowledgment notification is shown in FIG. 5.

Acknowledgment notification 500 may include a timestamp of when the notification 500 was sent, the device owner, device type, device MAC address (or other device identifier), and the manner to which confession reports will be sent. In some implementations, the entrance message and the acknowledgment notification 500 sent by the device serves as a handshake between the policy transmitter device and the user device on the network.

Figure 6:
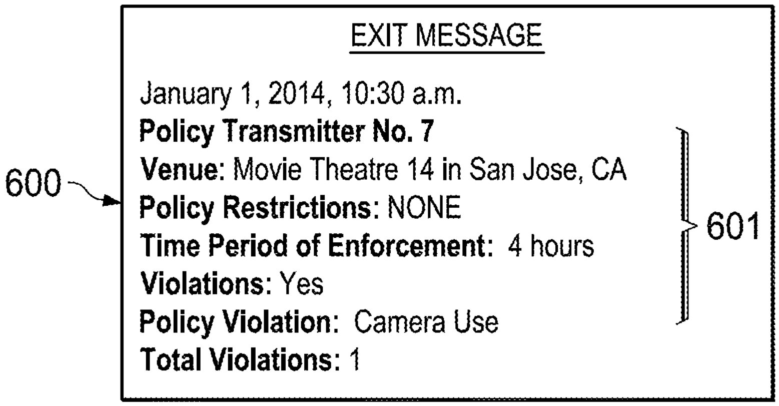
FIG. 6 is an exemplary illustration of an exit message in accordance with embodiments of the present disclosure.

Next, block 303 provides sending an exit message when the device leaves the device-restricted area. FIG. 6 is an exemplary illustration of an exit message 600. Exit message 600 may include information 601 such as instructions for the policy-restriction logic to rescind the policy restrictions. Exit message 600 may include a timestamp of when the exit message 600 was sent, the policy transmitter ID, the venue (e.g., mobile-device restricted area), the time period that the policy restrictions were enforced, whether any violations of the policies occurred, the specific violation(s), and the number of violations, if any.

For example, if the restricted device was used to take pictures while in the restricted area, which was contrary to the policy restrictions, the exit message may even include pictures that were taken while the mobile device was in the mobile-device restricted area and the location where the pictures were taken. Likewise, the exit message may include the number of microphone recordings obtained by the restricted device if the policy restrictions for the restricted area prohibited such use.

Accordingly, the policy restrictions may be removed once the restricted-user device leaves the restricted area or upon the expiration of the restriction time. For example, the policy restrictions may be rescinded when the restricted-user device detects (e.g., via GPS) that the device is clearly beyond the boundaries of the facility. In some implementations, when the restricted device detects that the device is beyond the boundaries of the facility, the policy-restriction logic rescinds the policy restrictions such that the user may freely operate the device.

For instance, there may be a scenario when an individual enters a restricted area with a device that is to be restricted and applies the restrictions thereto but the device's battery dies. In this scenario, when power is regained to the device, the device may detect that it may be beyond the bounds of the restricted area and therefore rescinds the policy restrictions.

Figure 7:
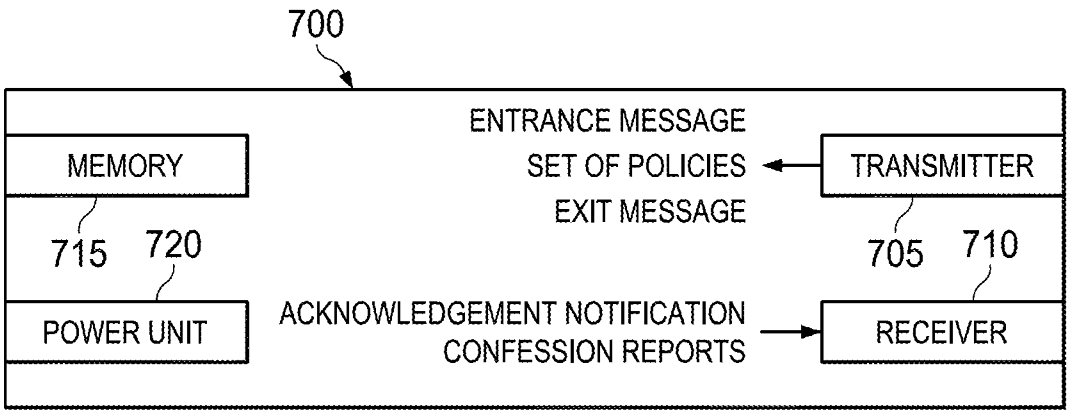
FIG. 7 is a block diagram of a policy transmitter device in accordance with systems and methods of the present disclosure.

FIG. 7 is a block diagram of a policy transmitter device 700. As shown, policy transmitter device 700 includes a transmitter unit 705, receiver unit 710, memory unit 715, and power unit 720. It should be understood by one having ordinary skill in the art that policy transmitter device 700 may have more or less components therein so long as the device 700 is capable of transmitting policy restrictions to device(s) within a certain geographical area.

In some embodiments, transmitter unit 705 emits the set of policy restrictions to each or a select group of devices on a device-restricted network. In some implementations, transmitter unit 705 transmits the policy restrictions to devices identified on the device-restricted network. For instance, referring back to FIG. 2, if the theatre supports a WiFi network, devices identified thereon may be sent the policy restrictions. As those having ordinary skill in the art may appreciate, transmitter unit 705 may include components consistent with those known in the art.

Receiver unit 710 may receive communications from devices on the device-restricted network. In particular, receiver unit 710 may receive acknowledgment notifications and confession reports. If an acknowledgment notification is not received, the policy transmitter device 700 may issue a notice to a server (or network of servers) that a device on the device-restricted network failed to issue an acknowledgment notification. System administrators or venue personnel that have user access to the servers on the device-restricted network may review the notice and take corrective action by asking the user of the device to comply with the transmitted restriction policies, leave the device with an administrator/personnel, or leave the venue all together. In one or more implementations, each device on the device-restricted network that has the relevant policy-restriction logic automatically sends the acknowledgment notification upon receiving the entrance message.

In some embodiments, when the policy transmitter device 700 receives the confession reports from the devices on the device-restricted network, the policy transmitter device 700 may store the confession report data in memory 715 and send this data to a server (or network of servers) on the device-restricted network. As such, system administrators that have user access to the device-restricted network may review the confession report data and take corrective action if necessary. In some embodiments, memory unit 715 may retain acknowledgment notification data that is sent from each device within the device-restricted network.

The present disclosure is not limited to sending the policy restrictions via wireless-radio means. For example, the policy restrictions (e.g., via a policy code) may be transmitted to a device on the device-restricted network by an audio means. For instance, a speaker emitting audible tones, embedded in a song, may be detected by a device's microphone thereby receiving the policy restrictions.

In addition, the policy codes and restrictions may be transmitted by use of Quick Response (QR) codes. A user may activate a camera function on the device and "swipe" the device over a medium containing the QR code to obtain the policy codes of restrictions. Accordingly, the policy restrictions may be received by a user device by various means.

Figure 8:
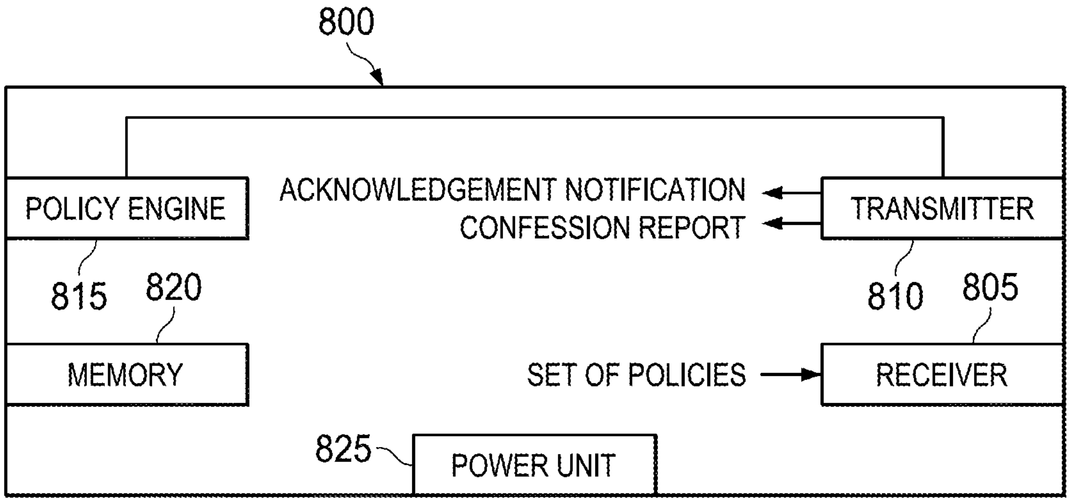
FIG. 8 is a block diagram of a device on a device-restricted network.

FIG. 8 is a block diagram of a device 800 on a device-restricted network. As shown, device 800 includes a receiver 805 to receive policy code(s) of restrictions regarding the manner to which a user may operate the device 800. Next, transmitter unit 810 may send acknowledgment notifications and confession reports. In addition, device 800 may include a memory unit 820 to retain the policy code(s) of restrictions and other information sent with an entrance message. A power unit 825 providing power to the device 800 is also included.

Most notably, device 800 includes a policy engine 815 which includes policy-restriction logic (not shown) which processes policy codes. Most notably, the policy engine 815 may detect input from a user to the device 800. As such, the policy-restriction logic within the policy engine is coupled to various device functions and auxiliaries of the device 800. In the event that the user attempts to operate the device in a manner contrary to the policy restrictions, the policy engine 815 generates an alert to the user on the device 800. After the alert is issued, if the user overrides and disregards the warning, a confession report will be generated detailing the violation.

For example, when the device 800 is a smartphone, the policy engine 815 detects when a call is initiated. Advantageously, the policy-restriction logic of the policy engine 815 may be further coupled to the phone's camera, microphone, wireless radio, location detection mechanism (e.g., GPS), and any other auxiliaries and sub-functions therein or coupled thereto.

Figure 9:
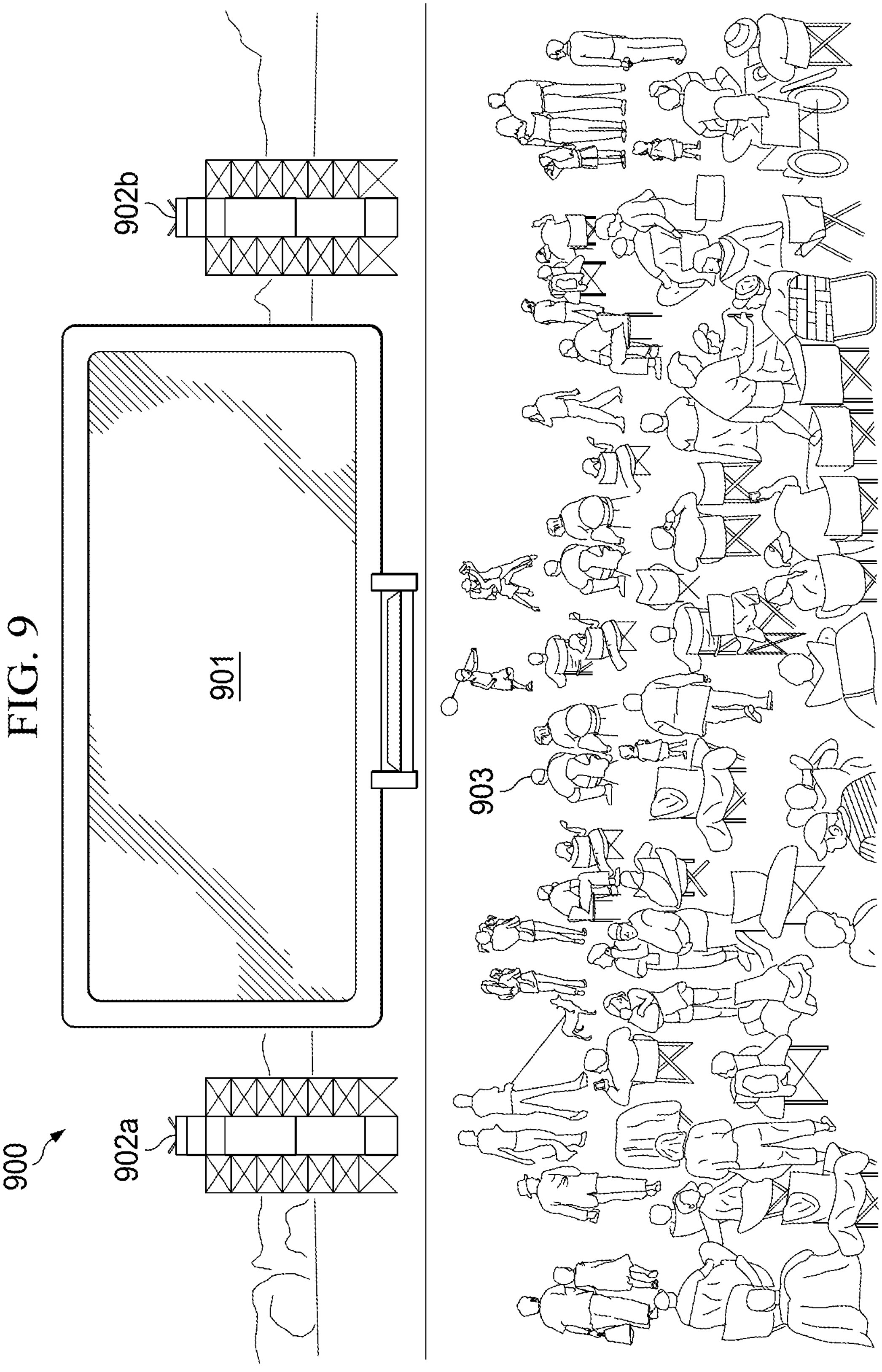
FIG. 9 is an exemplary illustration of a display system having policy transmitter devices that emit policy restrictions to nearby devices.

Moving forward, FIG. 9 is an exemplary illustration of a display system 901 having policy transmitter devices 902*a*, 902*b* to emit policy restrictions to nearby devices. In some embodiments, policy transmitter devices 902*a*, 902*b* periodically emit beacon signals containing a policy code of policy restrictions over a device-restricted network. In the event that a nearby device detects the beacon signal, the device will generate an acknowledgment notification as indicating that the device will adhere to the policy restrictions.

In some implementations, policy transmitter devices 902*a*, 902*b* emit signals in a 75-100 meter radius such that wireless-communication enabled devices within this geo-boundary may receive the emitted communications. It should be appreciated, however, that the present disclosure is not limited to any specific geo-boundary and that the area of the geo-boundary is determined by the power of the policy transmitter devices 902*a*, 902*b* to emit the beacon signals.

For instance, an event organizer may determine that content that is to be shown on the display system 901 to a crowd of patrons 903 is proprietary. Accordingly, policy transmitter devices 902*a*, 902*b* may emit policy codes of device-functionality restrictions, via a wireless means, such that any device that detects the signals must adhere to the policy restrictions (e.g., for a predetermined time duration). In the event that a patron 903 executes a function on the device that is contrary to the policy restrictions, a confession report is automatically sent from the device to the policy transmitter devices 902*a*, 902*b* or to a server (or network of servers) on the device-restricted network.

Figure 10:
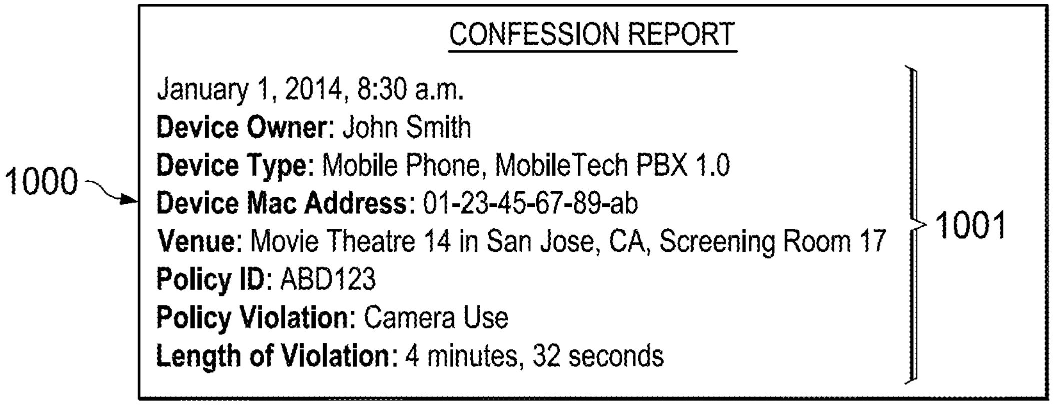
FIG. 10 is an exemplary illustration of a confession report in accordance with embodiments of the present disclosure.

FIG. 10 is an exemplary illustration of a confession report 1000. Confession report 1000 may include information 1001 regarding the violation of one or more policy restrictions. For example, confession report 1000 may include a timestamp of when the confession report is generated and, in fact, may correspond closely to the time that the violation occurred. Therefore, if a user disregards a warning that executing a specific function on a device would violate one of the policy restrictions, a confession report is immediately generated and sent from the device to the policy transmitter device or server(s) on the device-restricted network.

It should be understood by one having ordinary skill in the art that the present disclosure is not limited to sending confession reports 1000 to a transmitter device or server. A functionality-restriction service, for example, may be set up at one's residence. For instance, a homeowner may create a policy code that restricts guests from taking photographs inside the residence. In the event that policy restrictions are violated, confession reports 1000 may be dispatched and the homeowner may be informed of the violation by the homeowner's Mobile Wireless Service Provider through various means (e.g., a real-time SMS message of the confession report).

In addition, confession reports 1000 may also include the name of the device owner (e.g., John Smith), the device type, device MAC address, venue, policy ID, policy violations, and length of time that the policy was violated. Therefore, confession report 1000 provides enough information such that a system administrator or interested party may understand the nature of the violation to implement new policies or develop corrective actions. Confession report 1000 may be sent by various means (e.g., radio, camera, or speaker) and to any of various targets such as, but not limited to, an IP address, email address, or in the form of SMS text.

In some implementations, in the event that a user violates greater than one policy restriction within a predetermined time range, a single warning message—which addresses each violation—may be issued on the device to the user rather than a series of sequential warning messages. In addition, to ensure that the device can be used to address real-time situations and emergencies, the warning message may include an SOS emergency function to address such situations and emergencies.

Figure 11:
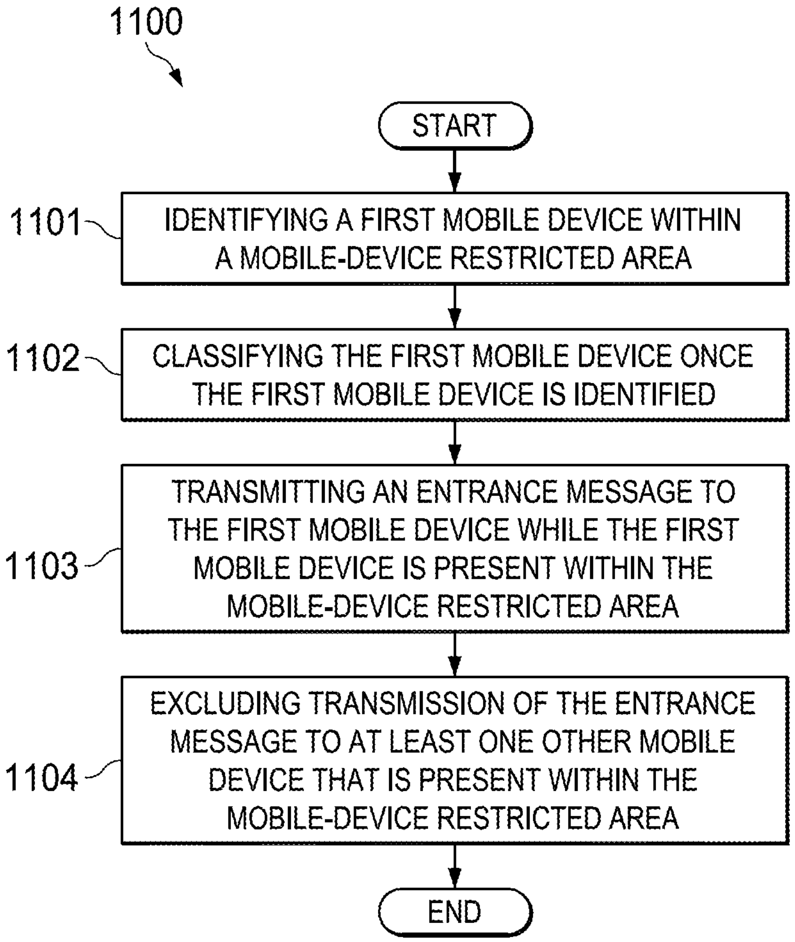
FIG. 11 is a flowchart of another method consistent with the present disclosure.

FIG. 11 is a flowchart 1100 of another method consistent with the present disclosure. The method described in flowchart 1100 is related to mobile devices on a device-restricted network. Flowchart 1100 begins at block 1101—identifying a first mobile device within a mobile-device restricted area. In some implementations, the first mobile device is identified by a wireless communications means (e.g., Wi-Fi). After the first mobile device is identified, classifying the first mobile device in at least one category according to block 1102.

Devices on the device-restricted network may be classified in various ways. For example, a mobile device may be classified as a guest device, security-personnel device, employee device, or system-administrator device. Accordingly, users of these classified devices may receive unique policy codes of restrictions based on their classifications.

Next, transmitting an entrance message to the first mobile device while the first mobile device is present within the mobile-device restricted area (block 1103). The entrance message may have a unique policy code of policy restrictions based on the device classification. As such, user devices with unique classifications may have different policy restrictions for operating their devices within the mobile-device restricted area.

In some embodiments, at least one mobile device does not receive an entrance message with the policy codes for device restrictions within the mobile-device restricted area. Therefore, it is possible based on a device classification (e.g., system administrator) that a mobile device may not be restricted within the mobile-device restricted area. The present disclosure provides a sophisticated approach to restrict device functionality depending upon user device classifications.

Figure 12:
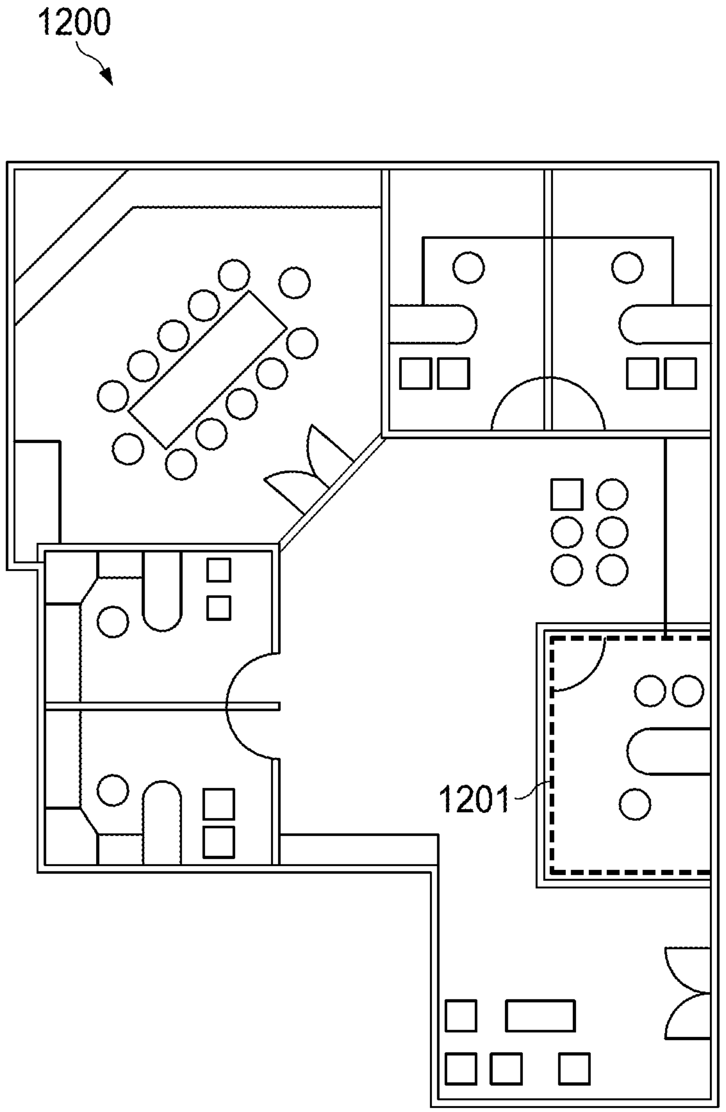
FIG. 12 is an exemplary floor plan layout having a mobile-device restricted area.

FIG. 12 is an exemplary floor-plan layout 1200 featuring a mobile-device restricted area 1201. The mobile-device restricted area 1201 may be an area where confidential or sensitive information is disclosed. Accordingly, within the mobile-device restricted area 1201, a policy transmitter device may emit policy restrictions to one or more devices on a device-restricted network to ensure that the confidential or sensitive information disclosed within the mobile-device restricted area may not be easily recorded and reproduced.

Figure 13:
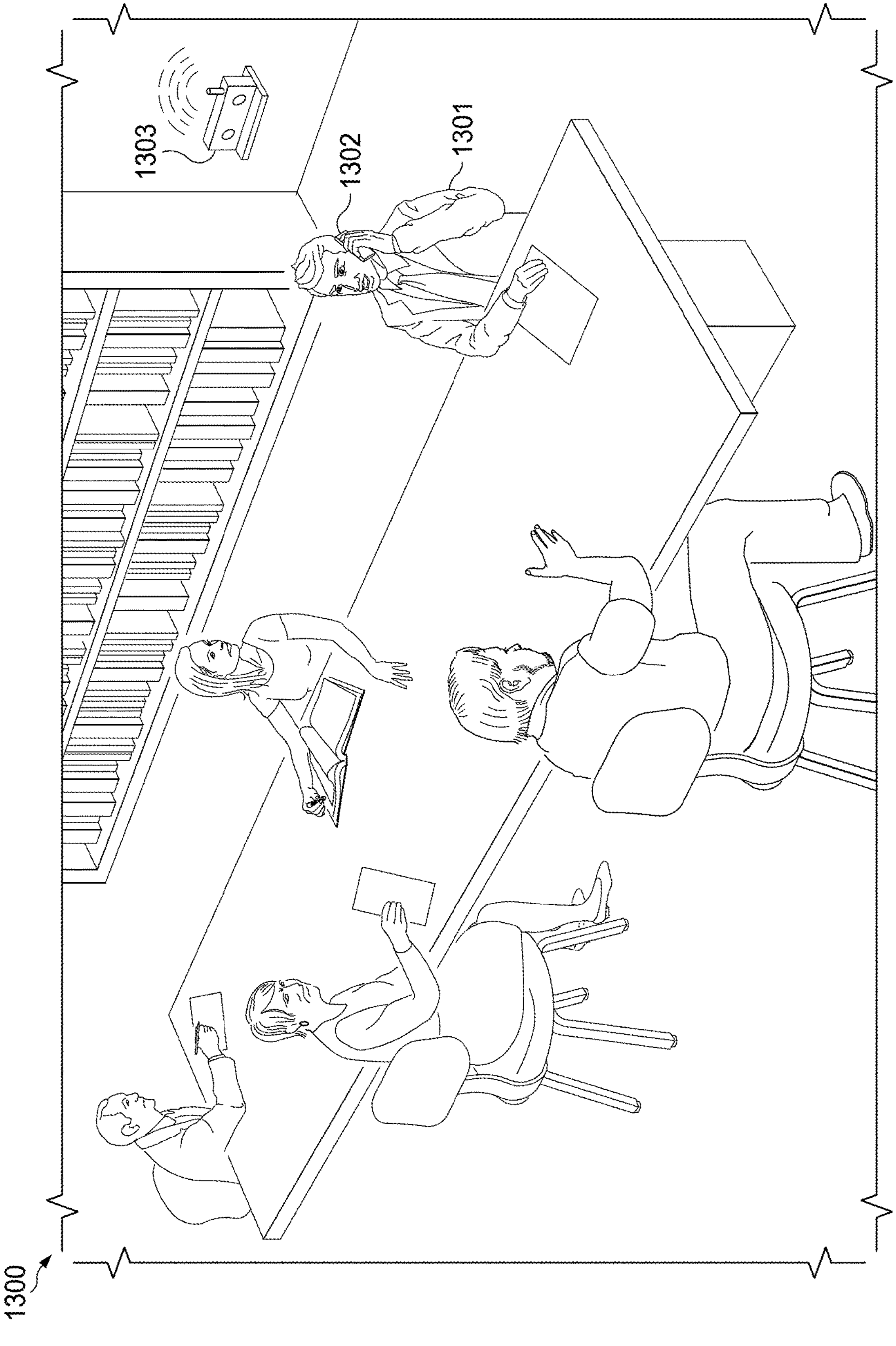
FIG. 13 is an exemplary illustration of a policy transmitter device that sends policy restrictions directly to a single mobile device present in an area that prohibits such use.

FIG. 13 is an exemplary illustration of a policy transmitter device 1303 that sends policy restrictions directly to a single mobile device 1302 present within an area 1300 (e.g., library) that prohibits such use. As shown, an individual 1301 is using his mobile device 1302 while in the library. The device-restricted network (not shown) may detect the device 1302 and may classify the individual as a guest. If the visitor's mobile device 1302 has the policy-restriction logic installed thereon (as may be required by library personnel), the policy transmitter device 1303 may send a policy code, that is unique to guests, directly to the mobile device 1302 thereby excluding the mobile devices operated by the other students in the library.

This disclosure pertains to device-monitoring systems, and in particular (but not exclusively) to detecting and deterring unauthorized use of electronic systems at distinct locations and during specific time periods. It will be understood by those having ordinary skill in the art that the present disclosure may be embodied in other specific forms without departing from the spirit and scope of the disclosure disclosed. In addition, the examples and embodiments described herein are in all respects illustrative and not restrictive. Those skilled in the art of the present disclosure will recognize that other embodiments using the concepts described herein are also possible.

What is claimed is:

1. An apparatus, comprising:

a receiver to receive an entrance message from a policy transmitter device, upon a detection of the apparatus near a device-restricted area;

wherein the entrance message includes at least one policy for a manner to which the apparatus is to be operated when present within the device-restricted area;

a transmitter coupled to the receiver to send an acknowledgement notification to the policy transmitter device or to a server on a network of the device-restricted area to indicate receipt of the entrance message and to indicate that the apparatus will accept and comply with the at least one policy included in the entrance message;

a policy manager coupled to the transmitter to:

detect an attempt to execute an action on the apparatus that is non-compliant with the at least one policy for which acknowledgement for compliance was given; and issue a warning message to a user upon detecting an attempt to execute an action contrary to the at least one policy for which acknowledgment for compliance was given; and wherein the transmitter is further to send a confession notification to the policy transmitter device or to the server on the network of the device-restricted area when the at least one policy is overridden and not complied by the apparatus.

2. The apparatus of claim 1, wherein the receiver is further to:

receive an exit notification when the apparatus is exiting the device-restricted area.

3. The apparatus of claim 2, wherein the exit notification includes at least one of pictures taken, the location where the pictures were taken, and a number of microphone recordings while the device was in the device-restricted area.

4. The apparatus of claim 3, wherein the entrance message is received when the receiver detects wireless communications from a policy transmitter device.

5. The apparatus of claim 3, wherein the apparatus is a smartphone or mobile device.

6. The apparatus of claim 3, wherein the device-restricted area is a mobile-device restricted area.

7. The apparatus of claim 3, wherein the transmitter is further to:

send indications related to the use of the apparatus while the apparatus is in the device-restricted area.

8. A non-transitory computer readable medium including code, when executed on a mobile device, to cause the mobile device to operate a policy engine to:

receive, via a receiver of the mobile device, an entrance message from a policy transmitter device, upon a detection of a device near a mobile-device restricted area;

wherein the entrance message includes at least one policy to restrict a manner in which a mobile device is to be operated when present within a mobile-device restricted area;

send, via a transmitter of the mobile device, an acknowledgement notification to the policy transmitter device or to a server on a network of the device-restricted area to indicate receipt of the entrance message and an indication by a mobile user to accept and comply with the at least one policy included in the entrance message;

detect an attempt to execute an action contrary to the at least one policy;

generate a warning message upon detection of an attempt to execute an action contrary to the at least one policy; and upon detection, send, via the transmitter, a confession notification to the policy transmitter device or to the server on the network of the device-restricted area when the at least one policy is overridden and not complied.

9. The non-transitory computer readable medium of claim 8, wherein the mobile device is further caused to:

receive, via the receiver, an exit notification when the mobile device is exiting the mobile-device restricted area.

10. The non-transitory computer readable medium of claim 9, wherein the exit notification includes at least one of pictures taken, the location where the pictures were taken, and a number of microphone recordings while the mobile device was in the mobile-device restricted area.

11. The non-transitory computer readable medium of claim 8, wherein the entrance message is received when the device detects wireless communications from a policy transmitter device.

12. The non-transitory computer readable medium of claim 8, wherein the mobile device is a smartphone.

13. The non-transitory computer readable medium of claim 8, wherein the policy engine is to:

receive, via the receiver, an exit message upon leaving the mobile-device restricted area.

14. The non-transitory computer readable medium of claim 8, wherein the policy engine is to:

send, via the transmitter, indications related to the use of the mobile device while the mobile device is in the mobile-phone restricted area.

15. An apparatus, comprising:

a transmitter to wirelessly transmit at least one restriction-device policy to a receiver of a mobile device, the mobile device near a device-restricted area; and a receiver coupled with the transmitter to:

receive an acknowledgement notification from the mobile device to indicate receipt of the at least one restriction-device policy and an indication to abide by the at least one restriction-device policy;

receive a confession notification transmitted from the mobile device within the device-restricted area in response to the mobile device attempting to execute an action that indicates the mobile device has overridden the at least one restriction-device policy, wherein the mobile device has generated a warning message of the attempt of an action contrary to the at least one restriction-device policy of the mobile device for which the acknowledgment was given.

16. The apparatus of claim 15, wherein the at least one restriction-device policy instructs the mobile device to enforce the policies for a pre-determined time duration.

17. The apparatus of claim 16, wherein the pre-determined time duration is consistent with a time duration of an event to be held in a mobile-device restricted area.

18. The apparatus of claim 15, wherein the at least one restriction-device policy is transmitted by any of a near field communication (NFC) technique, audible tones, or QR code.

19. The apparatus of claim 15, wherein the receiver is further to receive an acknowledgement notification to indicate an agreement by a user to accept and comply with the at least one restriction-device policy.

20. A non-transitory computer readable medium including code, when executed on a device, to cause the device to:

upon detection of a mobile device near a device-restricted area, wirelessly transmit at least one restriction-device policy to the mobile device to restrict a manner in which the mobile device is to be operated;

receive, from the mobile device, an acknowledgement notification to indicate receipt of the at least one restriction-device policy and an indication to abide by the at least one restriction-device policy; and receive, from the mobile device, a confession notification in response to the mobile device having not complied and overridden the at least one restriction-device policy, wherein the mobile device has generated a warning message to a user of the mobile device of an overriding an action contrary to the at least one restricted-device policy for which an acknowledgment for compliance was given.

21. The non-transitory computer readable code of claim 20, wherein the at least one restriction-device policy instructs the mobile device to enforce the at least one restriction-device policy for a pre-determined time duration.

22. The non-transitory computer readable code of claim 21, wherein the pre-determined time duration is consistent with a time duration of an event to be held in the mobile-device restricted area.

23. The non-transitory computer readable code of claim 20, wherein the at least one restriction-device policy is transmitted by any of a near field communication (NFC) technique, audible tones, or QR code.

24. The non-transitory computer readable code of claim 20, wherein the device is further caused to save the confession notification in memory.

25. A non-transitory computer readable medium including code, when executed by a mobile device, to cause the mobile device to operate a policy engine to:

receive, via a receiver of the mobile device, an entrance message from a policy transmitter device that is stationed near a mobile-device restricted area;

wherein the entrance message includes at least one policy for a manner to which a mobile device is to be operated when present within a mobile-device restricted area;

send, via a transmitter of the mobile device, an acknowledgement notification to the policy transmitter device or to a server on the network of the device-restricted area to indicate receipt of the entrance message and an indication to accept and comply with the at least one policy;

detect an attempt to execute an action contrary to the at least one policy to override the at least one policy;

upon detection, generate a warning message to the user that an attempt to execute an action contrary to the at least one policy for which acknowledgment for compliance was given; and upon detection, send, via the transmitter of the mobile device, a confession notification to the policy transmitter device in response to the mobile device having not complied with the policy.

26. The non-transitory computer readable medium of claim 25, wherein the entrance message is transmitted from the policy transmitter device to the mobile device via at least one beacon signal.

27. The non-transitory computer readable medium of claim 25, wherein the at least one policy includes at least one device-functionality policy restriction.

28. The non-transitory computer readable medium of claim 27, wherein the policy engine is to:

generate a confession report which includes information regarding a violation of the at least one device-functionality policy restriction.

29. The non-transitory computer readable medium of claim 28, wherein the policy engine is to:

send via the transmitter, the confession report to the policy transmitter device.

* * * * *